Feb. 19, 1957 M. E. PHELPS ET AL 2,781,625
PORTABLE NUT HARVESTER
Filed Dec. 30, 1955 8 Sheets-Sheet 2

INVENTORS
MORTON F. PHELPS,
MORTON E. PHELPS,
BY WILLIAM D. PHELPS, SR.

McMorrow, Berman & Davidson
ATTORNEYS.

Feb. 19, 1957  M. E. PHELPS ET AL  2,781,625
PORTABLE NUT HARVESTER
Filed Dec. 30, 1955  8 Sheets-Sheet 5

INVENTORS
MORTON F. PHELPS,
MORTON E. PHELPS,
BY WILLIAM D. PHELPS, SR.

McMorrow, Berman & Davidson
ATTORNEYS.

Feb. 19, 1957 M. E. PHELPS ET AL 2,781,625
PORTABLE NUT HARVESTER
Filed Dec. 30, 1955 8 Sheets-Sheet 6

INVENTORS
MORTON F. PHELPS,
MORTON E. PHELPS,
WILLIAM D. PHELPS, SR.
BY
McMorrow, Berman & Davidson
ATTORNEYS.

Feb. 19, 1957 M. E. PHELPS ET AL 2,781,625
PORTABLE NUT HARVESTER
Filed Dec. 30, 1955 8 Sheets-Sheet 7

INVENTORS
MORTON F. PHELPS,
MORTON E. PHELPS,
BY WILLIAM D. PHELPS, SR.

McMorrow, Berman + Davidson
ATTORNEYS.

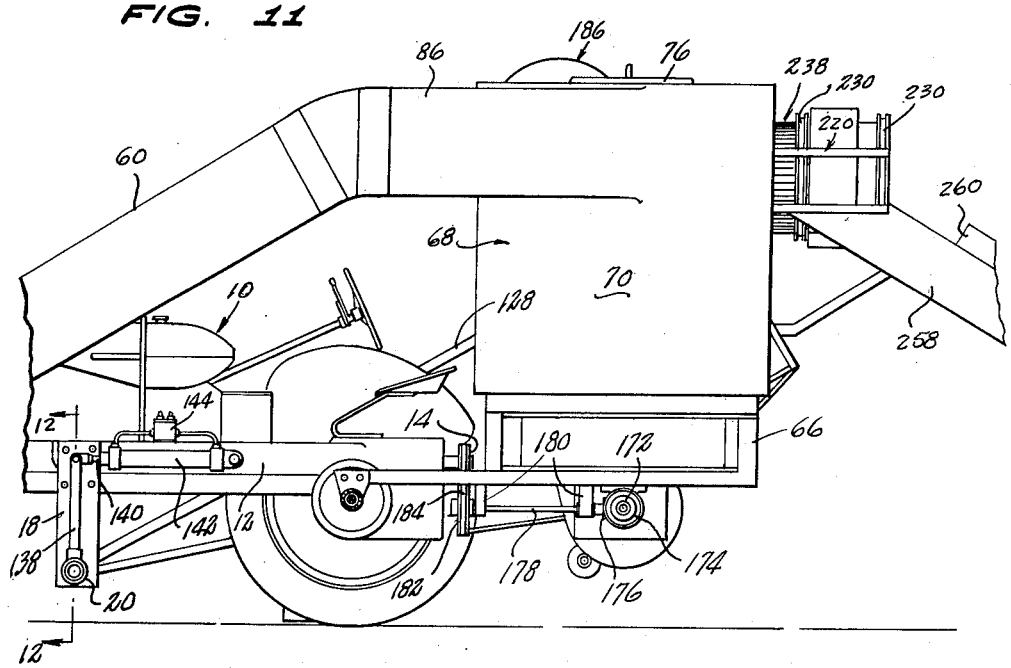
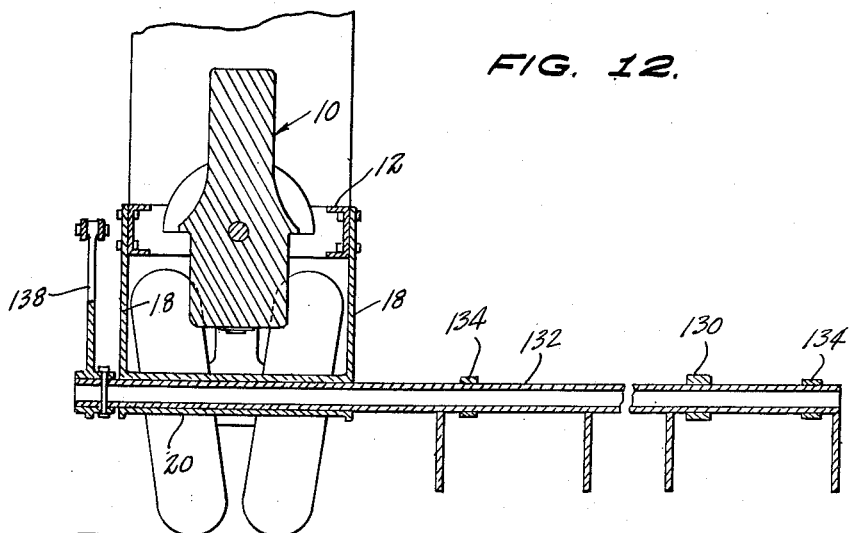

2,781,625
PORTABLE NUT HARVESTER

Morton E. Phelps, Morton F. Phelps, and
William D. Phelps, Sr., Little Rock, Ark.

Application December 30, 1955, Serial No. 556,513

5 Claims. (Cl. 56—328)

This invention relates to a portable nut harvester and has for its primary object to sweep from the ground nuts resting thereon and to separate the nuts from other sweepings.

Another object is to separate the heavier bodies, such as nuts and sticks from leaves and light trash collected in the sweepings.

A further object is to separate sticks from the nuts so gathered and to deposit the sticks on the surface that has been previously swept by the gatherer, or in a suitable receptacle, according to the desires of the user.

Other objects and advantages will become apparent from the following description taken in conjunction with the accompanying drawings, in which:

Figure 6 is a fragmentary sectional view taken substantially on the line 6—6 of Figure 4;

Figure 11 is a fragmentary side view of the harvester from the side opposite that illustrated in Figure 2, showing the near wheel of the tractor removed;

Figure 12 is an enlarged fragmentary sectional view taken substantially on the line 12—12 of Figure 11;

Tractor and fan

Figure 1:
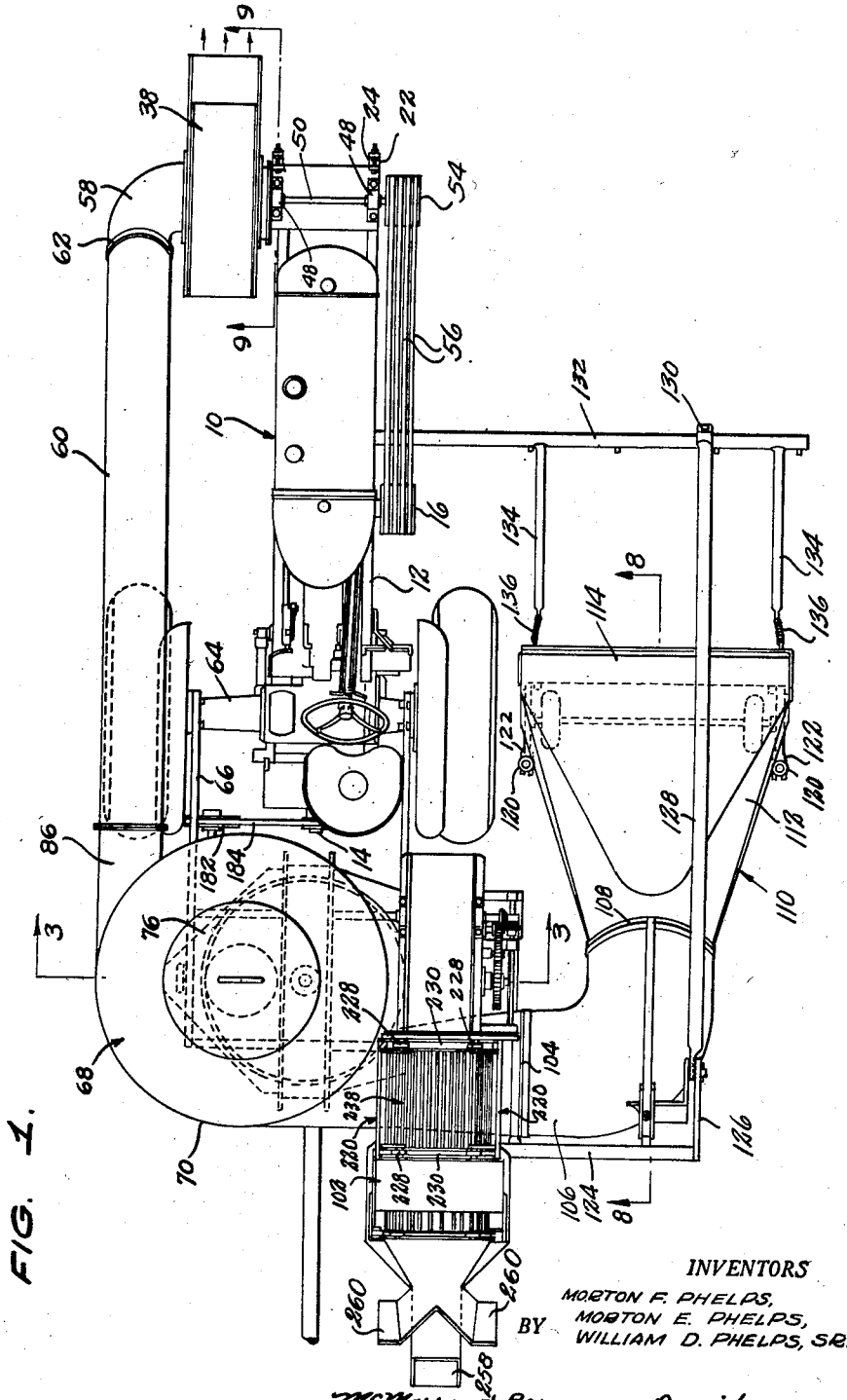
Figure 1 is a top plan view of a nut harvester embodying the features of this invention, showing it mounted on a conventional farm tractor.

Referring to the drawings in detail, a conventional farm tractor designated generally 10 is provided with a conventional frame 12 and carries at its rear end a power take-off drive mechanism 14 and carried by the side of the tractor 10 is a side power take-off 16 of conventional construction. Carried by the frame 12 and extending downwardly therefrom on opposite sides of the tractor 10 are legs 18, which carry adjacent their lower ends a tubular sleeve 20, Figure 12, the purpose of which will hereinafter appear. The legs 18 extend downwardly substantially midway between opposite ends of the tractor and the sleeve 20 extends between the legs below the underside of the frame 12.

Figure 9:
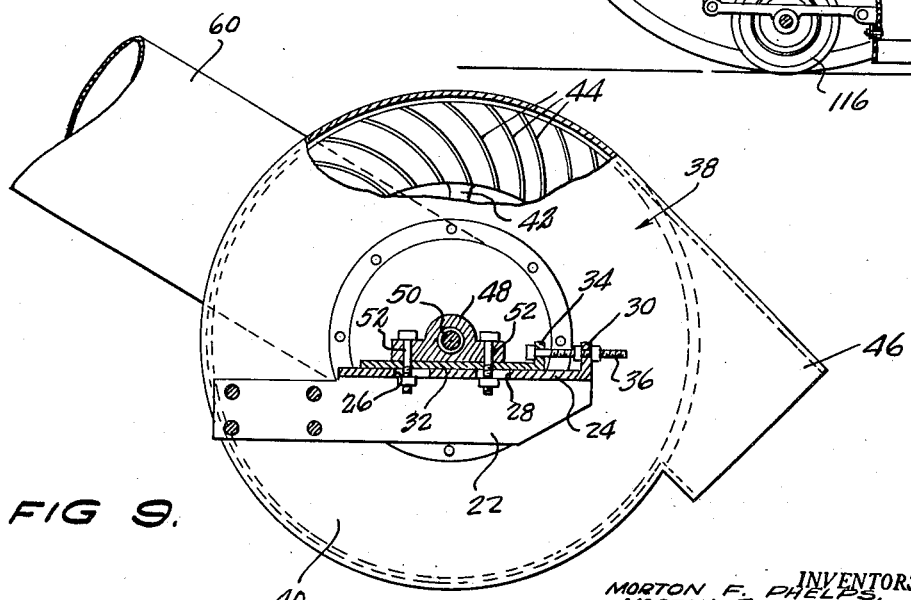
Figure 9 is a fragmentary enlarged sectional view taken substantially on the line 9—9 of Figure 1.

Secured to opposite side bars of the frame 12 and extending forwardly from said frame are brackets 22, Figure 9, carrying adjacent their upper edges inwardly extending flanges 24 having longitudinally spaced elongated slots 26 and 28 extending therethrough. Carried by the forward ends of the flanges 24 are upstanding ears 30 and mounted for longitudinal sliding movement on the brackets 22 is a slide plate 32 carrying adjacent opposite ends transversely spaced upwardly extending ears 34. Adjusting bolts 36 extend through aligned openings in the ears 30 and 34 for shifting the plate 32 longitudinally on the brackets 22 for a purpose to be more fully hereinafter explained. Carried by the slide plate 32, Figures 1, 2, and 9, adjacent one side of the tractor 10 for movement with said slide plate is a suction fan designated generally 38 which includes a fan housing 40 containing a rotor 42 carrying outwardly extending fan blades 44 which rotate within the housing 40 to create a draught therethrough. Said housing 40 has an air discharge nozzle 46 through which air drawn into the housing by the operation of the rotor 42 is discharged to atmosphere. Mounted on the slide plate 32 adjacent opposite sides of the tractor 10 and in axial alignment with the rotor 42 are pillow blocks 48 in which a drive shaft 50 is mounted to rotate. The pillow blocks 48 are clamped to the plate 32 and flanges 24 of the brackets 22 by clamping bolts 52 which extend through the pillow blocks and slide plate and the slots 26 and 28 so that when the adjustment of the slide plate 32 is made on the brackets 22 by the screw 36, the pillow blocks and slide plate may be clamped to the flanges 24 of the brackets 22 so as to retain the adjustment. Carried by the end of the shaft 50 remote from the rotor 42 is a drive pulley 54 which is coupled to the power take-off 16 by endless belts 56. It will thus be seen that when the power take-off 16 is set into motion, the rotor 42 and blades 44 will be rotated within the fan housing 40 to create a draught therethrough. The fan housing 40 is of the conventional type having an axial air intake port to which is coupled an elbow 58 of an air intake duct 60. The air duct 60 is coupled through a sliding connection 62 to the elbow 58 so as to permit movement of the suction fan 38 longitudinally on the brackets 22 without disturbing the air duct 60.

Mounted on the rear axle housing 64, Figure 1, of the tractor 10 and extending rearwardly therefrom is a frame 66 upon which the balance of the nut harvester is supported.

Cyclone separator

Figure 3:
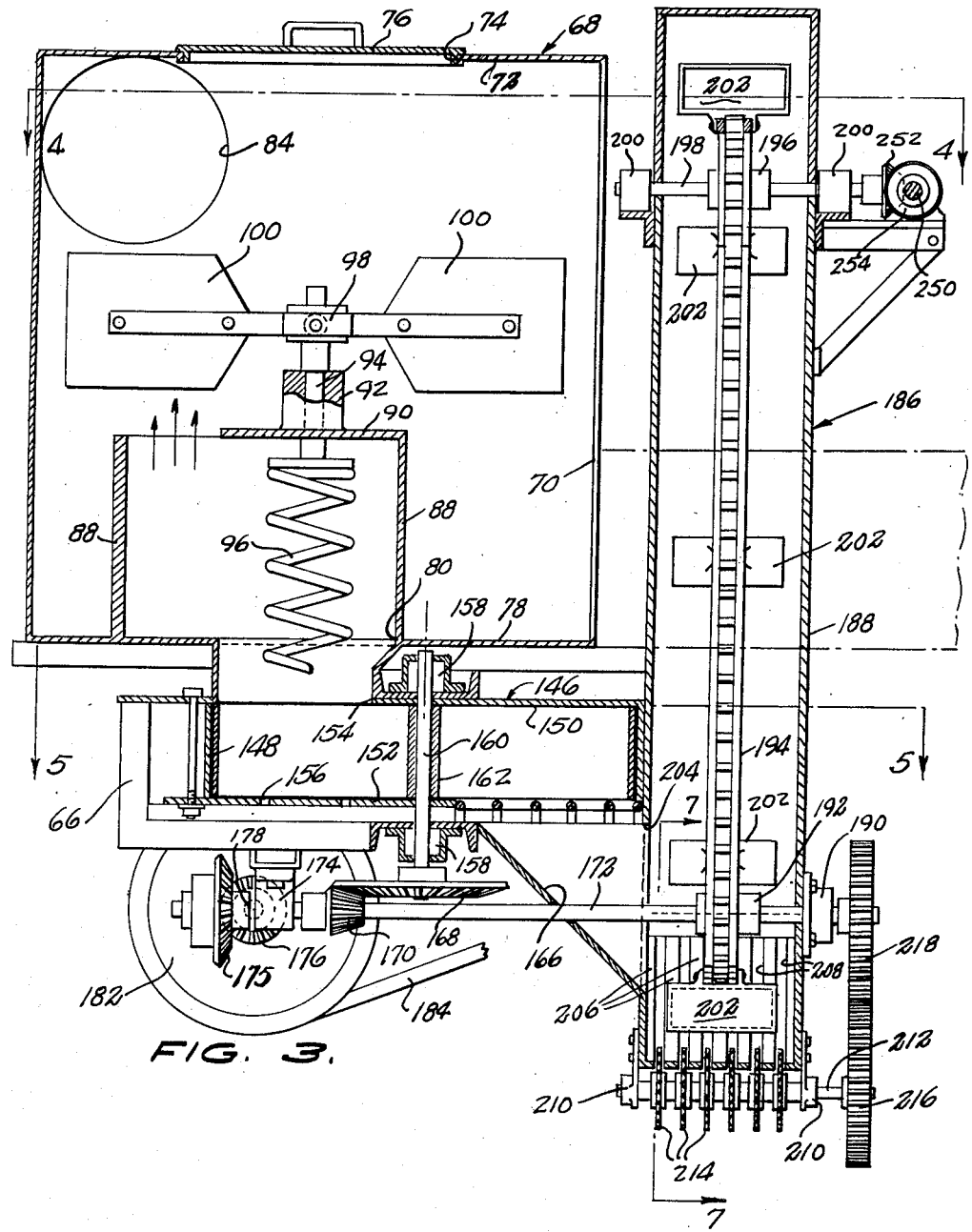
Figure 3 is an enlarged vertical sectional view taken substantially on the line 3—3 of Figure 1.
Figure 4:
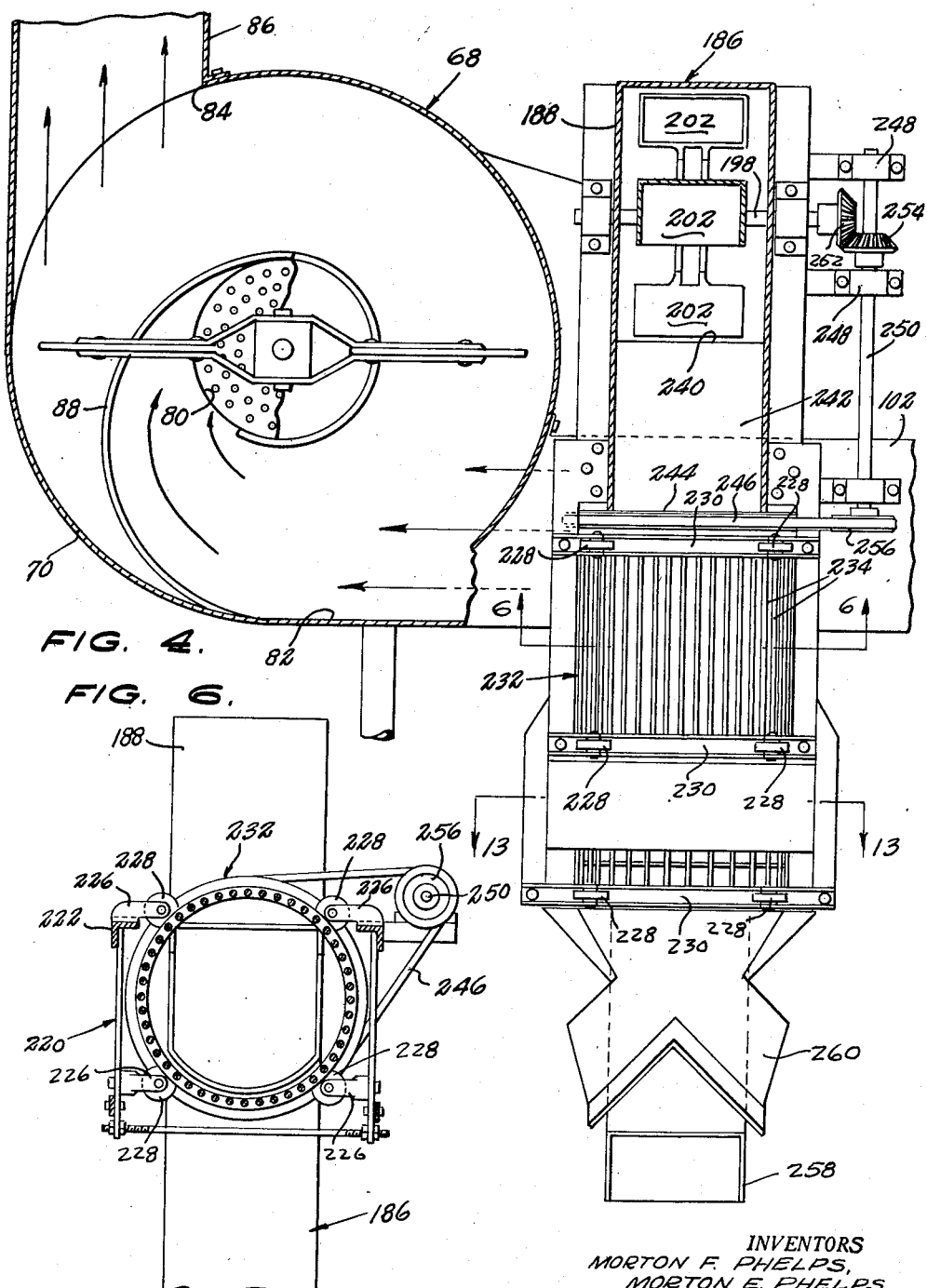
Figure 4 is a fragmentary sectional view taken substantially on the line 4—4 of Figure 3.

Mounted on the frame 66, Figures 1, 3 and 4, to the rear of the tractor 10 is a cyclone separator designated generally 68 which comprises a vertically extending circular cylindrical hollow body 70 closed at its upper end by a top 72 having an axial access opening 74 extending therethrough which is normally closed by a suitable removable cover 76. Extending through the bottom 78 of the cylindrical body 70 is an axial discharge opening 80, the purpose of which will hereinafter appear. Formed in the side of the body 70 adjacent the bottom 78 and opening tangentially thereinto is an inlet port 82 and opening through the side of the body 70 adjacent the top 72 and lying substantially perpendicular to the inlet port 82 is an outlet or exhaust port 84, Figure 1, to which the duct 60 is connected by means of a nipple 86. It will thus be seen that when the suction or exhaust fan 38 is set into operation, a draught of air will be created through the cyclone separator 68 from the inlet port 82 through the outlet port 84. Carried by the circular cylindrical body 70 adjacent the lower end thereof is a convolute baffle 88 which extends from the inlet port 82 inwardly and partially embraces the discharge opening 80 to define a wall which will create a swirling motion in the air entering the inlet port 82 as it passes through the body 70 and into the nipple 86 through the outlet port 84. As illustrated in Figure 3, a top wall 90 is carried by the baffle 88 directly above the discharge opening 80 and carried by the top wall 90 and extending upwardly therefrom is a bearing sleeve 92 in which is mounted for rotation a vertically extending shaft 94 which aligns axially with the opening 80 and carries at its lower end a stick pusher or spiral impeller 96 which extends downwardly from the top 90 through the discharge opening 80, as will be readily understood upon reference to Figure 3. Carried by the upper end of the shaft 94 for rotation within the hollow cylindrical body 70 are transversely extending arms 98 carrying fan blades 100 against which the air passing through the hollow body 70 of the cyclone separator 68 impinges as it swirls upwardly upon leaving the convolute baffle 88 to rotate said fan blades and drive the impeller 96 so as to cause sticks and heavier bodies to be pushed downwardly through the discharge opening 80.

Nut gatherer

Carried by the body 70 and communicating with the interior thereof through the inlet port 82 is a horizontally extending nipple 102, Figures 1, 2, 8 and 10, carrying at its end remote from the separator 68 a swivel joint 104. Connected to the nipple 102 by the swivel joint 104 for movement in a vertical arcuate path about the axis of said swivel joint is an elbow 106 to the opposite end of which is connected by a swivel joint 108 a gatherer designated generally 110. This gatherer comprises a suction nozzle 112, Figures 1 and 10, which increases in cross section in a horizontal direction as it recedes from the swivel joint 108 and decreases in width in accordance with its diminution in cross section in the other plane to define a rectangular suction nozzle of relatively broad dimensions at its end remote from the elbow 106. A pick-up nozzle 114 is carried by the suction nozzle 112 and extends downwardly from the broad narrow mouth thereof into close proximity with the ground. Supporting wheels 116 are carried by the pick-up nozzle 114 and are connected for vertical adjustment to the suction nozzle 112 through the medium of a threaded link 118 carrying adjusting nuts 120 which engage opposite sides of an ear 122 carried by and extending horizontally outwardly from opposite sides of the suction nozzle 112. It is to be understood, of course, that there is a wheel 116, link 118 and ear 122 on each side of the suction nozzle 112 so that both sides thereof are supported adjacent the pick-up nozzle 114.

Figure 2:
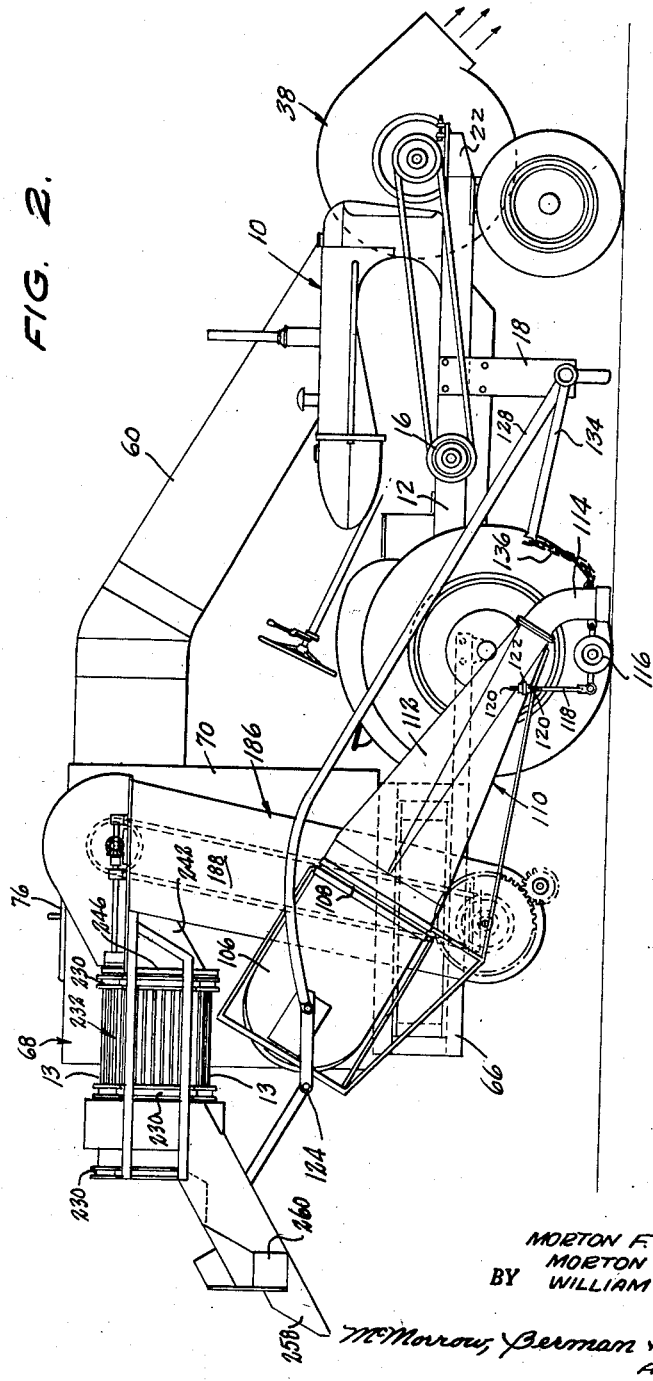
Figure 2 is a side view in elevation of Figure 1.

Welded or otherwise secured to the nipple 102 and extending laterally outwardly therefrom beyond the side of the tractor 10 remote from the cyclone separator 68 is an arm 124, Figures 1 and 2, carrying at its end remote from the nipple 102 a forwardly extending leg or bracket arm 126 to which is connected one end of an arched supporting bar 128 which extends forwardly above the gatherer 110 and carries at its forward end a sleeve 130. Mounted for rotation within the sleeve 20, Figure 12, and extending through the sleeve 130 is a rock shaft 132 which projects laterally beyond the side of a tractor 10 adjacent the gatherer 110 and carries rearwardly extending lift arms 134 which are connected by flexible couplings such as chains 136 to the pick-up nozzle 114 so that when the shaft 132 is rocked in a clockwise direction when viewed as in Figure 2, the forward end of the gatherer 110 will be lifted clear of the ground during periods of transportation or storage.

Carried by the shaft 132 adjacent the side of the tractor 10 remote from the gatherer 110 is a lever 138, Figure 11, which is connected to a piston rod 140 which works in a cylinder 142 carried by the frame 12 of the tractor which is coupled through a control valve 144 to the hydraulic system of the tractor so that by manipulating the control valve 144, the piston rod 140 may be projected or retracted within the cylinder 142 to manipulate the lever 138 and rock the shaft 132 to raise or lower the lift arms 134.

Air lock and transfer unit

Figure 5:
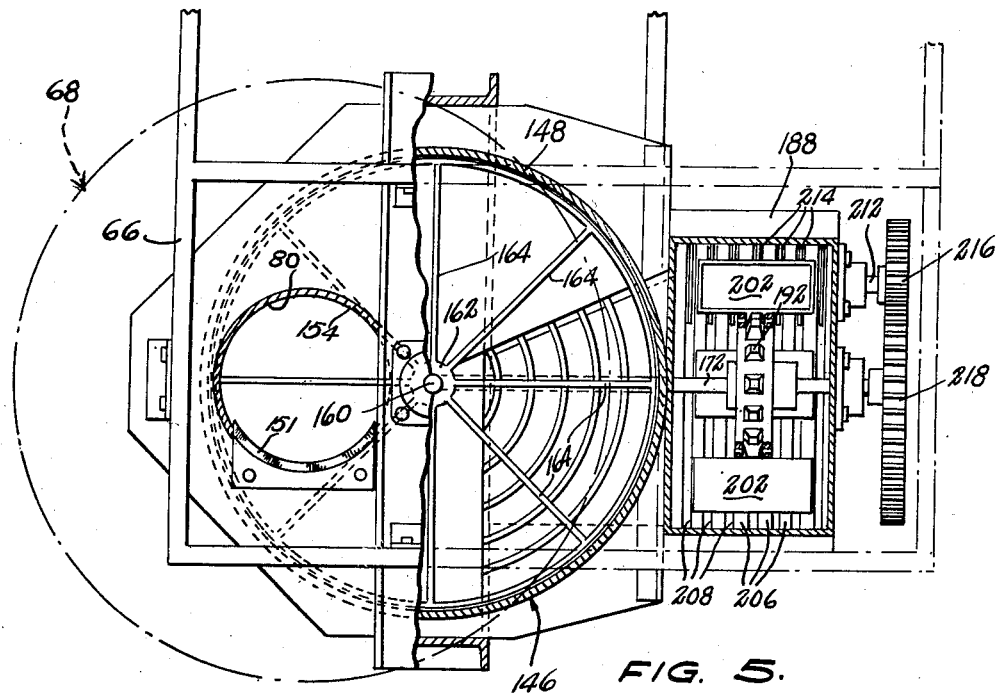
Figure 5 is a fragmentary horizontal sectional view taken substantially on the line 5—5 of Figure 3.
Figure 7:
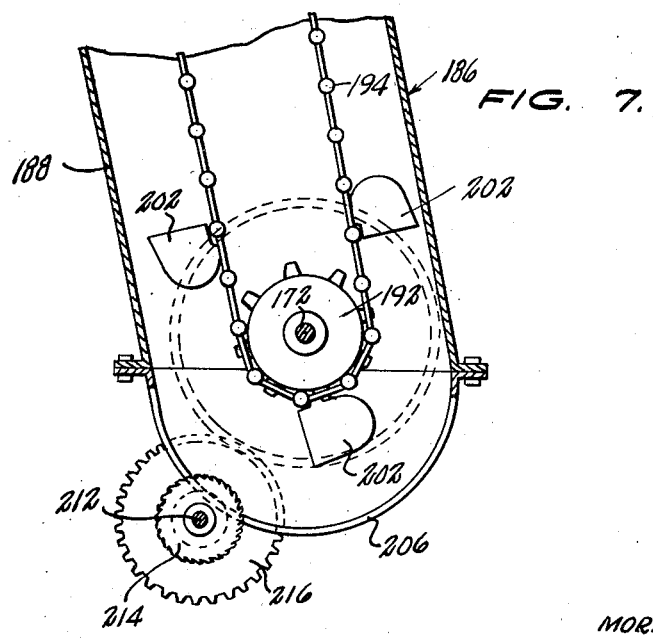
Figure 7 is a fragmentary sectional view taken substantially on the line 7—7 of Figure 3.
Figure 8:
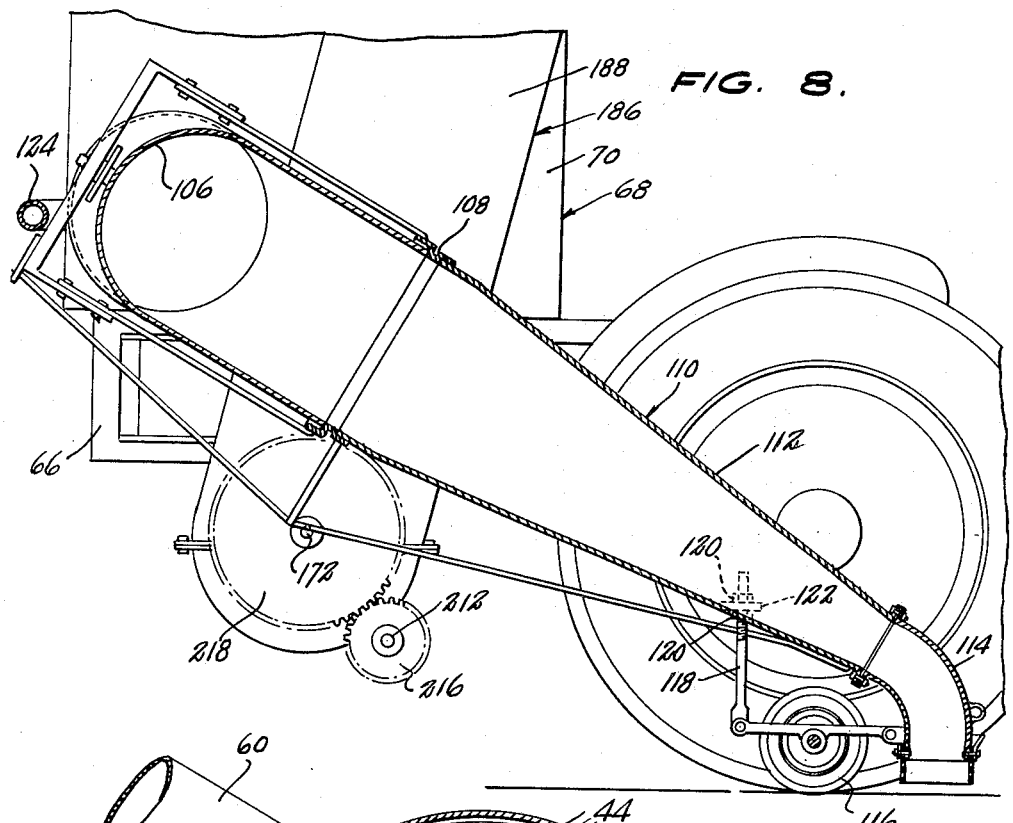
Figure 8 is a fragmentary enlarged sectional view taken substantially on the line 8—8 of Figure 1.
Figure 10:
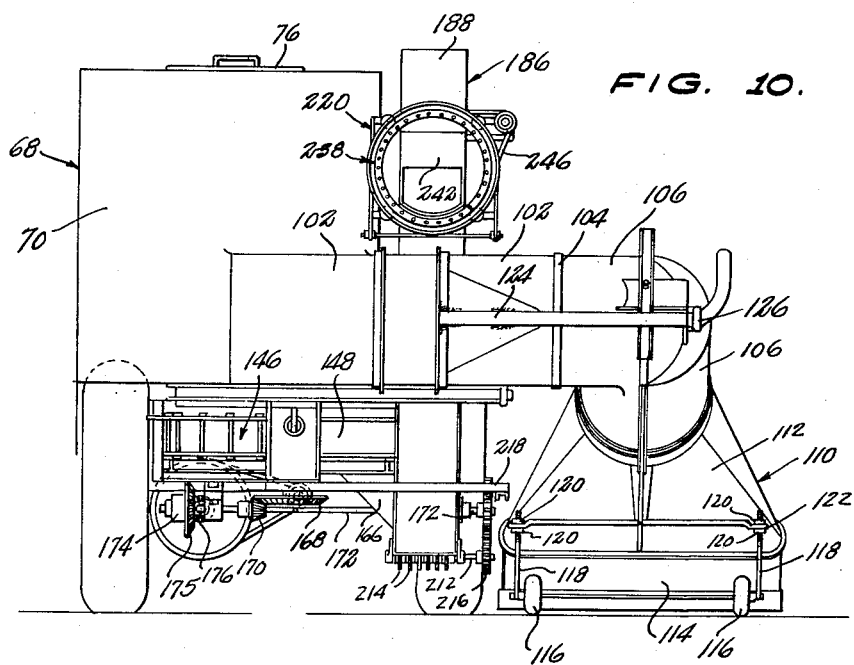
Figure 10 is a rear view of the harvester.

Supported on the frame 66 beneath the cyclone separator 68 is an air lock and transfer unit designated generally 146, Figures 10 and 3, which comprises a circular cylindrical chamber 148 having a top wall 150 and a bottom wall 152. Extending through the top wall in eccentric relation to the chamber 148 and in axial alignment with the discharge opening 80 of the cyclone separator 68 is an opening 154 through which nuts and sticks separated in the separator 68 from lighter sweepings enters the air lock and transfer unit 146. Carried by the top wall 150 is a knife blade 149, Figure 5, having a concave cutting edge 151 which extends into the opening 154 in concentric relation thereto. This knife blade cooperates with the air lock blades 164 in cutting into short lengths sticks which may tend to clog the opening 154. An annular row of circumferentially spaced openings 156 extends through the bottom wall 152 of the air lock and transfer unit 146 in concentric spaced relation to the opening 154 to admit air into the air lock and transfer unit to blow any light trash which might enter said unit with the nuts and sticks upwardly and into the cyclone separator 68. Carried by the top and bottom of the air lock and transfer unit 146 are antifriction bearings 158 in which is mounted for rotation a drive shaft 160. The drive shaft 160 lies along the axis of the circular cylindrical body 148 of the air lock and transfer unit 146 and carried by said shaft for rotation therewith within said body 148 is a hub 162, Figure 5, from which radiate circumferentially spaced blades 164. Communicating with the interior of the circular cylindrical body 148 in substantially diametrically opposite relation to the annular row of openings 156 is a chute 166 into which nuts and sticks are moved by the blades or vanes 164 when the shaft 160 is rotated. A drive gear 168 is carried by the shaft 160 adjacent the lower end thereof and meshes with a drive pinion 170 mounted on a horizontally extending shaft 172 which is carried in a bearing 174 carried by and extending downwardly from the underside of the frame 66. Mounted on the shaft 172 in spaced relation to the pinion 170 is a miter gear 175 which meshes with a miter pinion 176 carried by a jack shaft 178 which is mounted in longitudinal spaced bearings 180, Figure 11, carried by the frame 66. A drive pulley 182 is carried by the shaft 178 adjacent the forward end thereof and is coupled through the medium of an endless belt 184 with the power take-off 14 of the tractor 10. It will thus be seen that when the power take-off 14 is set into operation, the shaft 172 will be driven to impart rotation to the shaft 160 and the transfer blades 164 to cause them to rotate within the housing 148 and sweep nuts and sticks deposited in the air lock and transfer unit 146 into the chute 166, while preventing air from entering the cyclone separator 68 through the chute 166.

Elevator

An elevator designated generally 186, Figures 2, 3, 4 and 7, is carried by the housing 148 and extends upwardly from the chute 166. This elevator comprises an elevator housing 188 carrying adjacent its lower end a bearing 190 in which the shaft 172 is journaled and mounted on the shaft 172 within the elevator housing 188 is a drive sprocket 192 for the elevator chain 194. The upper end of the elevator chain 194 is trained over a driven sprocket 196 which is supported on a horizontally extending driven shaft 198 mounted in bearings 200 carried by the elevator housing 188 adjacent the upper end thereof. Elevator buckets 202 are carried by the chain 194 to elevate nuts and sticks which are delivered to the elevator 168 through an inlet opening 204 formed in the housing 188 and registering with the discharge end of the chute 166. In the preferred form of the invention, the lower end of the elevator housing 188 comprises spaced bars 206 defining between them slots 208 through which sticks which are properly oriented will pass and be delivered to the ground. Mounted in suitable bearing brackets 210 carried by the elevator housing 188 adjacent the lower end thereof is a shaft 212 carrying longitudinally spaced toothed disks 214 which extend into the elevator housing 188 through the slots 208 and assist in orienting sticks delivered to the housing through the chute 166. A drive pinion 216 is carried by the shaft 212 for rotation therewith adjacent the end thereof remote from the chute 166 and this pinion meshes with a drive gear 218 carried by the shaft 172 so that when the power take-off 14 is operated, the disks 214 will be rotated in their respective slots 208.

*Nut and stick separator*

Figure 13:
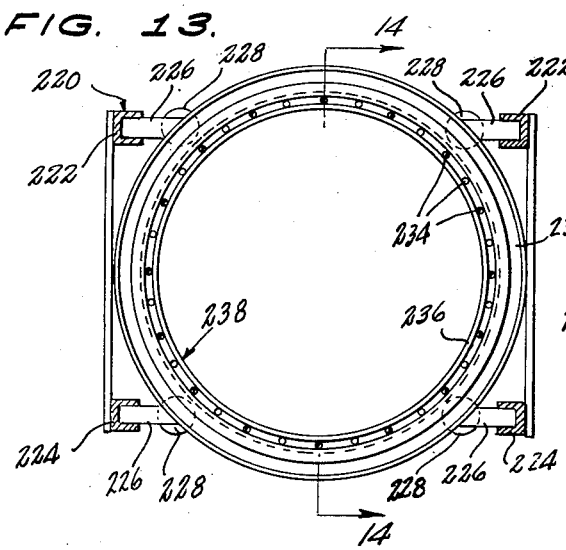
Figure 13 is a fragmentary enlarged sectional view taken substantially on the line 13—13 of Figure 4.
Figure 14:
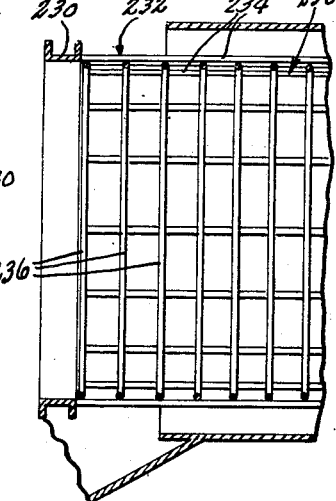
Figure 14 is a fragmentary sectional view taken substantially on the line 14—14 of Figure 13.

Carried by the elevator housing 188 adjacent the upper end thereof is a supporting frame designated generally 220, Figures 1, 10, 11 and 13, comprising upper and lower spaced parallel supporting bars 222 and 224 carrying bracket arms 226 which extend toward one another, as illustrated in Figure 13, and carry at their inner ends rollers 228 which rotate about spaced horizontal axes and are received in the annular grooves defined between the flanges of annular channels 230 of a rotary cylinder designated generally 232 and made up of circumferentially spaced bars 234 which are welded to longitudinally spaced annular bars 236 to define a rotary screen. The screen rotates about a substantially horizontal axis which tilts slightly downwardly toward the rear of the machine and the upper or forward end of the rotary screen communicates with the interior of the elevator housing 188 through a discharge opening 240 which extends through said housing adjacent the upper end thereof. The opening 240 is connected to the interior of the rotary screen 232 by means of a chute 242, as will be readily understood upon reference to Figure 2. Carried by the rotary cylinder 232 adjacent the end thereof which encircles the chute 242 is an annular ring-shaped pulley 244 about which is trained a drive belt 246. Carried by the elevator housing 188 and extending outwardly therefrom on the side thereof remote from the cyclone separator 68 are bearing brackets 248 in which is journaled for rotation about a horizontal axis a shaft 250. A miter gear 252 is carried by the shaft 198 of the elevator 186 and meshes with a miter gear 254 which is secured to the shaft 250 for rotation therewith. A drive pulley 256 is carried by the shaft 250 and driving connection is established between the drive pulley 256 and the pulley 244 carried by the rotary separator 232 through the medium of the belt 246. Adjacent the end of the rotary screen 232 remote from the elevator 186, alternate longitudinal bars 234 are omitted to define relatively large openings through which may pass nuts delivered to the separator by the elevator which fall into a nut discharge chute 258. On the other hand, sticks which are too large to pass through the rotary screen 232 are discharged through the open end thereof remote from the elevator 186 into a stick discharge chute 260.

In use, it will be evident that as the tractor 10 is driven over a nut laden area with the suction fan 38 in operation, nuts, sticks, leaves and trash will be drawn through the pick-up nozzle 114 and the suction nozzle 112 of the gatherer 110 to be delivered into the cyclone separator 68 through the elbow 106 and nipple 102 where the convolute baffle 88 will be encountered to give the incoming air and sweepings an upward swirl toward the outlet port 84. The upward swirling motion of the incoming air will carry the leaves and trash upwardly to be discharged through the outlet port 84, while the nuts and sticks being heavier will strike the convolute baffle 88 and be discharged downwardly through the discharge opening 80 in the bottom of the cyclone separator 68. The air passing through the cyclone separator 68 will draw air upwardly through the annular row of openings 156 in the air lock and transfer unit to further aid in producing an upward air current through the cyclone separator. Passing through the cyclone separator with a circular motion, the air will cause the fan blades 100 to rotate and drive the spiral impeller 96 in a direction to force sticks downwardly through the discharge opening 80 and into the air lock and transfer unit. Entering the air lock and transfer unit, the nuts and sticks will be swept by the blades 164 into the chute 166 from which they are delivered into the elevator housing 188 of the elevator 186. Passing downwardly through the chute 166, the nuts and sticks will rest upon the bars 206, forming the bottom of the elevator housing and will encounter the toothed blades 214 which serve to orient the sticks in such a manner that they will pass through the spaces 208 between the bars 206. Such sticks as fail to pass through the spaces 208, together with the nuts, will be picked up by the elevator buckets 202 and carried upwardly through the elevator housing 188 to be discharged through the opening adjacent the upper end thereof and into the chute 242 to be delivered into the interior of the rotary screen 232. The agitation of the nuts and sticks delivered into the interior of the rotary screen 232 by the rotation thereof will cause the nuts to pass through the spaces between the bars 234 adjacent the end of the screen 232 remote from the elevator 186 and fall into the nut discharge chute 258, whereas the sticks carried into the rotary screen 232 will be delivered through the open end of said screen remote from the elevator 186 and into the stick discharge chute 260. Obviously, the chute 258 may be connected to any suitable receptacle into which the nuts may be delivered, whereas the sticks delivered to the chute 260 would be deposited on the ground.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. In a portable nut harvester, a mobile frame, a separator including a vertically disposed hollow body having a closed top and a bottom provided with a discharge opening carried by said frame, said body also having an inlet port adjacent the bottom thereof and an outlet port adjacent the top thereof, a source of suction operatively connected to said body outlet port, means operatively connected to said body inlet port for receiving nuts and associated sticks and sweepings from a ground surface and delivering same through said inlet port into said body, an upstanding convolute baffle positioned within said body and extending over said body discharge opening and carried by the body bottom, an air lock and transfer unit embodying a chamber having a top wall and a bottom wall provided with spaced openings positioned below said hollow body so that the top wall is adjacent the bottom of said body and the bottom wall is remote from the bottom of said body, the top wall of said chamber having an opening connected in communication with the discharge opening in said body bottom, a discharge chute connected in communication with the bottom wall of said chamber, and means in said chamber for conveying the nuts and broken up sticks and sweepings received from said body to said chute.

2. In a portable nut harvester, a mobile frame, a separator including a vertically disposed hollow body having a closed top and a bottom provided with a discharge opening carried by said frame, said body also having an inlet port adjacent the bottom thereof and an outlet port adjacent the top thereof, a source of suction operatively connected to said body outlet port, means operatively connected to said body inlet port for receiving nuts and associated sticks and sweepings from a ground surface and delivering same through said inlet port into said body, an upstanding convolute baffle positioned within said body and extending over said body discharge opening and carried by the body bottom, a vertically disposed spiral impeller positioned within and spaced from said baffle and mounted on said baffle for free rotation about a vertical axis, an air lock and transfer unit embodying a chamber having a top wall and a bottom wall provided with spaced openings positioned below said hollow body so that the top wall is adjacent the bottom of said body and the bottom wall is remote from the bottom of said body, the top wall of said chamber having an opening connected in communication with the discharge opening in said body bottom, a discharge chute connected in communication with the bottom wall of said chamber, and means in said chamber for conveying the nuts and broken up sticks and sweepings received from said body to said chute.

3. The portable nut harvester according to claim 2 wherein the means in said chamber comprises a plurality of blades radially disposed around and rotatable as a unit about a vertical axis.

4. The portable nut harvester according to claim 2 which includes in addition means on the impeller and actuable responsive to air flowing out of said baffle and toward said body outlet port for effecting the rotation of said impeller.

5. In a portable nut harvester, a mobile frame, a separator including a vertically disposed hollow body having a closed top and a bottom provided with a discharge opening carried by said frame, said body also having an inlet port adjacent the bottom thereof and an outlet port adjacent the top thereof, a source of suction operatively connected to said body outlet port, means operatively connected to said body inlet port for receiving nuts and associated sticks and sweepings from a ground surface and delivering same through said inlet port into said body, an upstanding convolute baffle positioned within said body and extending over said body discharge opening and carried by the body bottom, a vertically disposed spiral impeller positioned within and spaced from said baffle and mounted on said baffle for free rotation about a vertical axis, an air lock and transfer unit embodying a chamber having a top wall and a bottom wall provided with spaced openings positioned below said hollow body so that the top wall is adjacent the bottom of said body and the bottom wall is remote from the bottom of said body, the top wall of said chamber having an opening connected in communication with the discharge opening in said body bottom, a knife blade carried by the top wall of said chamber and extending into the opening in the top wall of said chamber, a discharge chute connected in communication with the bottom wall of said chamber, and means in said chamber for conveying the nuts and broken up sticks and sweepings received from said body to said chute, said means in said chamber comprising a plurality of blades radially disposed about and rotatable as a unit about a vertical axis, said knife blade cooperating with said blades when being rotated to cut any sticks in short lengths that may be associated with the nuts and sweepings.

References Cited in the file of this patent

UNITED STATES PATENTS

| | | |
|---|---|---|
| 997,185 | Fasting | July 5, 1911 |
| 2,246,352 | Falkiner | June 17, 1941 |
| 2,290,315 | Cline et al. | July 21, 1942 |
| 2,458,258 | Furr | Jan. 4, 1949 |
| 2,471,326 | Hoyt | May 24, 1949 |
| 2,499,037 | Roles | Feb. 28, 1950 |
| 2,502,810 | Waters | Apr. 4, 1950 |
| 2,594,776 | Hiatt | Apr. 29, 1952 |
| 2,635,750 | Hoyt | Apr. 21, 1953 |
| 2,699,637 | Nisbet | Jan. 18, 1955 |
| 2,716,856 | Burns | Sept. 6, 1955 |
| 2,721,655 | Pritchett | Oct. 25, 1955 |